US009291095B2

(12) United States Patent
Koch (10) Patent No.: US 9,291,095 B2
(45) Date of Patent: Mar. 22, 2016

(54) ROTARY INTERNAL COMBUSTION ENGINE

(71) Applicant: Randy Koch, Grass Lake, MI (US)

(72) Inventor: Randy Koch, Grass Lake, MI (US)

( * ) Notice: Subject to any disclaimer, the term of this patent is extended or adjusted under 35 U.S.C. 154(b) by 209 days.

(21) Appl. No.: 13/832,876

(22) Filed: Mar. 15, 2013

(65) Prior Publication Data

US 2014/0261289 A1     Sep. 18, 2014

(51) Int. Cl.
| | |
|---|---|
| *F02B 53/00* | (2006.01) |
| *F01C 1/356* | (2006.01) |
| *F01C 21/08* | (2006.01) |
| *F01C 21/18* | (2006.01) |
| *F02B 55/02* | (2006.01) |
| *F02B 55/14* | (2006.01) |

(52) U.S. Cl.
CPC ............. *F02B 53/00* (2013.01); *F01C 1/3566* (2013.01); *F01C 21/08* (2013.01); *F01C 21/18* (2013.01); *F02B 55/02* (2013.01); *F02B 55/14* (2013.01)

(58) Field of Classification Search
CPC .......... F02B 53/00; F02B 55/14; F02B 55/02; F02B 55/16; F01C 21/08; F01C 21/18
USPC ...... 123/200, 241, 242, 294, 429, 43 R, 47 R, 123/229; 418/54, 195
See application file for complete search history.

(56) References Cited

U.S. PATENT DOCUMENTS

| | | | | |
|---|---|---|---|---|
| 1,562,299 A | * | 11/1925 | Cundy | 123/229 |
| 2,110,524 A | * | 3/1938 | Hodges | 123/240 |
| 2,235,118 A | * | 3/1941 | Ripke | 418/228 |
| 2,352,877 A | * | 7/1944 | Wolstenholme | 418/33 |
| 2,594,629 A | | 4/1952 | Exner | |
| 2,760,466 A | * | 8/1956 | Black, Jr. | 123/203 |
| 2,805,545 A | | 9/1957 | Wilman | |
| 2,840,058 A | * | 6/1958 | Stringer | 418/38 |
| 2,944,533 A | * | 7/1960 | Park | 123/249 |
| 3,467,070 A | * | 9/1969 | Green | 123/229 |
| 3,712,273 A | | 1/1973 | Thomas | |
| 3,923,032 A | * | 12/1975 | Studenroth | 123/193.6 |
| 4,127,094 A | * | 11/1978 | Barry | 123/229 |
| 4,170,213 A | * | 10/1979 | Williams | 123/222 |
| 4,590,761 A | | 5/1986 | Zettner | |
| 4,949,688 A | * | 8/1990 | Bayless | 123/245 |

(Continued)

FOREIGN PATENT DOCUMENTS

| | | |
|---|---|---|
| CH | 104 168 A | 4/1924 |
| DE | 14 51 715 A1 | 5/1969 |

(Continued)

OTHER PUBLICATIONS

Search Report and Written Opinion for International Application No. PCT/US2014/018499, dated 8 Jul. 2014.

*Primary Examiner* — Jorge Pereiro
*Assistant Examiner* — Jason T Newton
(74) *Attorney, Agent, or Firm* — Young Basile Hanlon & MacFarlane P.C.

(57) ABSTRACT

A rotary internal combustion engine includes an arcuate compression chamber, an arcuate expansion chamber, an output shaft, and a piston coupled to the output shaft for movement through the arcuate compression chamber and the arcuate expansion chamber. The piston has a leading end, a trailing end, an inlet valve that is located at the leading end of the piston for receiving a compressible fluid from the compression chamber and an outlet valve that is located at the trailing end of the piston for expelling a combustion gas into the arcuate expansion chamber.

18 Claims, 5 Drawing Sheets

(56) References Cited

U.S. PATENT DOCUMENTS

| | | |
|---|---|---|
| 5,046,465 A * | 9/1991 | Yi .................................. 123/248 |
| 5,560,196 A | 10/1996 | Schlote |
| 5,660,038 A | 8/1997 | Stone |
| 6,546,908 B1 * | 4/2003 | Pekau ........................... 123/206 |
| 6,880,494 B2 | 4/2005 | Hoose |
| 7,073,319 B1 | 7/2006 | Rhyne |
| 8,151,759 B2 * | 4/2012 | Wright .......................... 123/233 |
| 2005/0263129 A1 * | 12/2005 | Wright .......................... 123/233 |

FOREIGN PATENT DOCUMENTS

| | | |
|---|---|---|
| DE | 25 41 152 A1 | 3/1977 |
| GB | 01622 | 0/1911 |

\* cited by examiner

ROTARY INTERNAL COMBUSTION ENGINE

TECHNICAL FIELD

The disclosure herein relates to the field of rotary internal combustion engines.

BACKGROUND

Internal combustion engines are engines in which a combustible mixture, such as an air-fuel mixture, is ignited in a combustion chamber of the engine in order to apply force to a component of the engine. In a reciprocating piston internal combustion engine, such as an Otto cycle engine or a diesel engine, the combustion chamber is a cylinder that houses a reciprocating piston. Combustion of the fuel causes continued reciprocation of the piston, and the reciprocating motion of the piston is converted into a rotational output by a crankshaft that is coupled to the reciprocating piston by a connecting rod. Inefficiencies are associated with the reciprocating motion of the piston. For example, combustion occurs at or near top dead center, where the torque angle between the piston and the crankshaft is at or near zero.

Rotary internal combustion engines of many types have been proposed as alternatives to reciprocating piston internal combustion engines with varying degrees of success. Some rotary internal combustion engine designs place one or more pistons within a "cylinder" in the form of a torus. These engines are sometimes referred to as toroidal internal combustion engines. Some of these designs include one or more pistons that travel in a continuous circular motion without reciprocation, while turning an output shaft in unison with the motion of the piston. While this arrangement avoids some of the sources of inefficiencies experienced in reciprocating piston internal combustion engines, previously proposed designs have failed to achieve success.

SUMMARY

One aspect of the disclosed embodiments is a rotary internal combustion engine that includes an arcuate compression chamber, an arcuate expansion chamber, an output shaft, and a piston coupled to the output shaft for movement through the arcuate compression chamber and the arcuate expansion chamber. The piston has a leading end, a trailing end, an inlet valve that is located at the leading end of the piston for receiving a compressible fluid from the arcuate compression chamber and an outlet valve that is located at the trailing end of the piston for expelling a combustion gas into the arcuate expansion chamber.

Another aspect of the disclosed embodiments is a rotary internal combustion engine that includes an arcuate compression chamber, an arcuate expansion chamber, an output shaft, and a piston coupled to the output shaft. The piston has a leading end, a trailing end, an inlet valve located at the leading end, an outlet valve located at the trailing end, and an internal chamber in communication with the inlet valve and the outlet valve.

BRIEF DESCRIPTION OF THE DRAWINGS

The various features, advantages and other uses of the present apparatus will become more apparent by referring to the following detailed description and drawing in which.

DETAILED DESCRIPTION

The disclosure herein is directed to rotary internal combustion engines in which a piston travels in a constant direction along a circular path within an arcuate cylinder. The rotary internal combustion engines discussed herein improve on prior designs by providing any or all of favorable oxidant to fuels ratios under diverse load conditions, adequate compression of the combustible mixture, thermal energy conservation, flexible fuels capabilities, and complete combustion and exhaust of the combustible mixture. As will be explained herein, locating the combustion chamber within the piston allows the combustible mixture to be compressed within the piston as the piston travels within the cylinder. The piston includes inlet and outlet valves that can be opened and closed to allow the combustible mixture to be compressed within the piston and to allow expansion of the combustible mixture subsequent to ignition. To maximize the effectiveness of the compression and expansion phases of the engine's cycle, the cylinder is divided into an arcuate compression chamber and an arcuate expansion chamber that are isolated from one another by transverse valve assemblies that open to allow the piston to pass from the compression chamber into the expansion chamber and from the expansion chamber into the compression chamber. In some implementations, the transverse valve assemblies and the piston can be shaped complementarily with respect to one another in order to minimize dead space between the piston and the valves when the valves are opened or closed.

Figure 1:
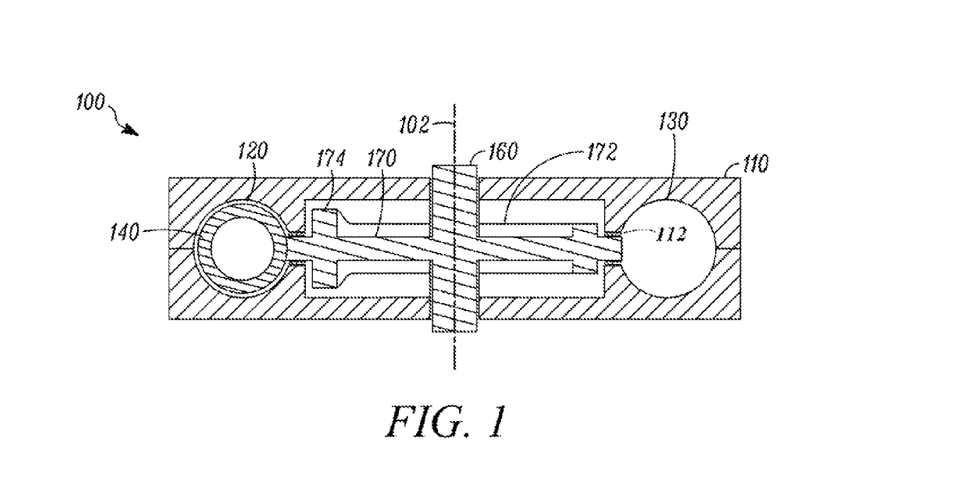
FIG. 1 is a side cross-section view of a rotary internal combustion engine.

FIG. 1 is a side cross-section view of a rotary internal combustion engine 100. The rotary internal combustion engine 100 includes a housing 110 that defines an arcuate compression chamber 120 and an arcuate expansion chamber 130. The compression chamber 120 and the expansion chamber 130 cooperate to define a substantially toroidal cylinder through which a piston 140 travels in a continuous, unidirectional, circular path.

The piston 140 is coupled to an output shaft 160. The output shaft 160 can extend along a central axis 102 of the rotary internal combustion engine 100, wherein the substantially toroidal cylinder that is defined by the compression chamber 120 and the expansion chamber 130 is arranged around the central axis 102, with the central axis 102 at its center point. In some implementations, two or more of the rotary internal combustion engines described herein can be combined, such as by interconnection of the output shafts 160, to allow the power output of the engine to scale to a desired application.

The piston 140 is coupled to the output shaft 160 such that travel of the piston through the compression chamber 120 and the expansion chamber 130 causes rotation of the output shaft 160. In particular, the piston 140 can be coupled to the output shaft 160 such that the output shaft 160 rotates in unison with the travel of the piston 140. In order to cause rotation of the output shaft 160 in unison with the piston 140, the piston 140 can be rigidly coupled to the output shaft 160. In one example, the piston 140 and the output shaft 160 are each coupled to a rotor 170 that is disposed within the housing 110. In some implementations, the output shaft 160 and/or the piston 140 can be formed integrally with the rotor 170. In other implementations, the rotor 170 can be rigidly connected to the piston 140 and/or the output shaft 160 by conventional means such as mechanical fasteners. Although the implementation described herein includes a single piston 140 that is coupled to the rotor 170, other implementations can include two or more pistons 140 that are each coupled to the rotor 170.

In order to seal the compression chamber 120 and the expansion chamber 130, sealing members 112 can be provided at the interfaces between the rotor 170 and the housing 110 to allow pressurization within the compression chamber 120 and the expansion chamber 130.

To allow for actuation of valves in correspondence to movement of the piston 140 within the compression chamber 120 and the expansion chamber 130, the rotor 170 can include a cam surface 172 having surface features 174, such as changes in elevation of the cam surface 172, which are configured to cause actuation of valves or other portions of the rotary internal combustion engine 100, as will be described in detail herein.

Figure 2:
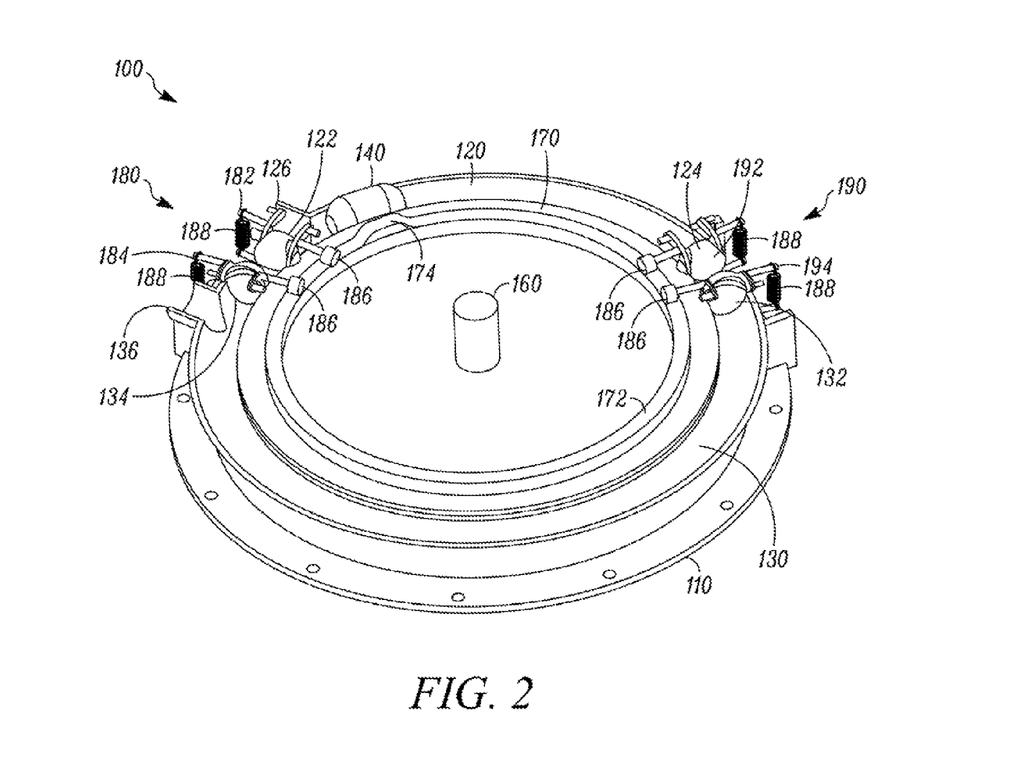
FIG. 2 is a cut-away perspective view showing the rotary internal combustion engine.

As best seen in FIG. 2, the compression chamber 120 extends from a first end 122 to a second end 124. The piston 140 is adapted to travel through the compression chamber 120 such that it enters the compression chamber 120 at the first end 122 of the compression chamber 120 and exits at the second end 124 of the compression chamber 120.

In order to allow intake of a compressible fluid into the compression chamber 120, an intake port 126 is formed by the housing and is in communication with the compression chamber 120 for supplying the compressible fluid to the compression chamber 120. In the illustrated example, a single intake port 126 is provided adjacent to the first end 122 of the compression chamber. In other implementations, multiple intake ports 126 can be provided at multiple locations along the compression chamber 120. Multiple intake ports can be provided, for example, to accomplish differing compression ratios or to aid in the removal of combustion byproducts from the piston 140.

In some implementations, the compressible fluid is a gaseous oxidant, such as air. Furthermore, the compressible fluid can consist essentially of air. In implementations where the compressible fluid that is introduced into the compression chamber 120 at the intake port 126 is an oxidant and does not include a fuel, the fuel can be introduced into the interior of the piston 140 and mixed with the compressible fluid within the piston to define a combustible mixture, such as an air-fuel mixture, within the piston 140, as will be described further herein. In other implementations, the compressible fluid can be a combustible mixture that includes an oxidant, such as air, and a fuel.

The compression chamber 120 is substantially arcuate and extends along an arc that is centered on the central axis 102, such that the shape of the compression chamber 120 is substantially that of a portion of a torus. As measured with respect to the central axis 102, the compression chamber 120 in the illustrated example extends through an arc of approximately 110°. It should be understood, however, that the length of the compression chamber 120 in this example is illustrative, and the rotary internal combustion engine 100 is not limited to designs that incorporate a compression chamber 120 of any particular length.

The expansion chamber 130 extends from a first end 132 to a second end 134. The piston 140 is adapted to travel through the expansion chamber 130 by entering the expansion chamber 130 at the first end 132 and exiting the expansion chamber 130 at the second end 134. An exhaust port 136 is formed by the housing 110 and is located adjacent to the second end 134 of the expansion chamber 130. The exhaust port 136 is in communication with the expansion chamber 130 for receiving combustion gases resulting from combustion of the combustible mixture. The expansion chamber 130 is substantially arcuate and is in the form of an arc that is centered on the central axis 102. Thus, the expansion chamber 130 is in the shape of a portion of a torus that is centered on the central axis 102. In the illustrated example, the expansion chamber 130 extends through an arc of approximately 220° as measured at the central axis 102. While the rotary internal combustion engine 100 is not limited to use with expansion chambers 130 of any particular length, it is noted that the length of the expansion chamber 130 is related to the angle through which the piston 140 is able to apply torque to the output shaft 160. Thus, some advantages can be realized by providing the rotary internal combustion engine 100 with an expansion chamber 130 that extends through an arc of greater than 180°, as measured at the central axis 102.

In order to isolate the compression chamber 120 and the expansion chamber 130 with respect to one another, a first transverse valve assembly 180 and a second transverse valve assembly 190 are provided. The first transverse valve assembly 180 is positioned between the second end 134 of the expansion chamber 130 and the first end 122 of the compression chamber 120. In order to seal the compression chamber 120, the first transverse valve assembly 180 includes a first compression chamber valve 182, and the second transverse valve assembly 190 includes a second compression chamber valve 192. The first compression chamber valve 182 is located at the first end 122 of the compression chamber 120 and is moveable from a closed position, wherein the first end 122 of the compression chamber 120 is sealed, to an open position, wherein the first end 122 of the compression chamber 120 is not sealed, in order to allow the piston 140 to enter the compression chamber 120. The second compression chamber valve 192 is moveable from a closed position, wherein the second end 124 of the compression chamber 120 is sealed, to an open position, wherein the second end 124 of the compression chamber 120 is not sealed, in order to allow the piston 140 to exit the compression chamber 120 at the second end 124 thereof.

In order to seal the expansion chamber 130, the second transverse valve assembly 190 includes a first expansion chamber valve 194, and the first transverse valve assembly 180 includes a second expansion chamber valve 184. The first expansion chamber valve 194 is located at the first end 132 of the expansion chamber 130. The second expansion chamber valve 184 is located at the second end 134 of the expansion chamber 130. The first expansion chamber valve 194 is moveable from a closed position, wherein the expansion chamber 130 is sealed at the first end 132, to an open position, wherein the expansion chamber 130 is not sealed at the first end 132, to allow the piston 140 to enter the expansion chamber 130. The second expansion chamber valve 184 is moveable from a closed position, wherein the expansion chamber 130 is sealed at the second end 134, to an open position, wherein the expansion chamber 130 is not sealed at the second end 134, to allow the piston 140 to exit the expansion chamber 130 at the second end 134 thereof.

Each of the first compression chamber valve 182, the second compression chamber valve 192, the first expansion chamber valve 194, and the second expansion chamber valve 184 can be provided with a contact member 186, such as a roller, that is adapted to engage the cam surface 172 of the rotor 170 and open its respective valve upon engagement with one or more features formed on the cam surface 172, such as the surface features 174. To promote engagement with the cam surface 172 and to bias the valves toward the closed position, each of the first compression chamber valve 182, the second compression chamber valve 192, the first expansion chamber valve 194, and the second expansion chamber valve 184 can include a biasing element 188, such as a tension spring, that is adapted to bias the respective valve to the closed position thereof.

Figure 3:
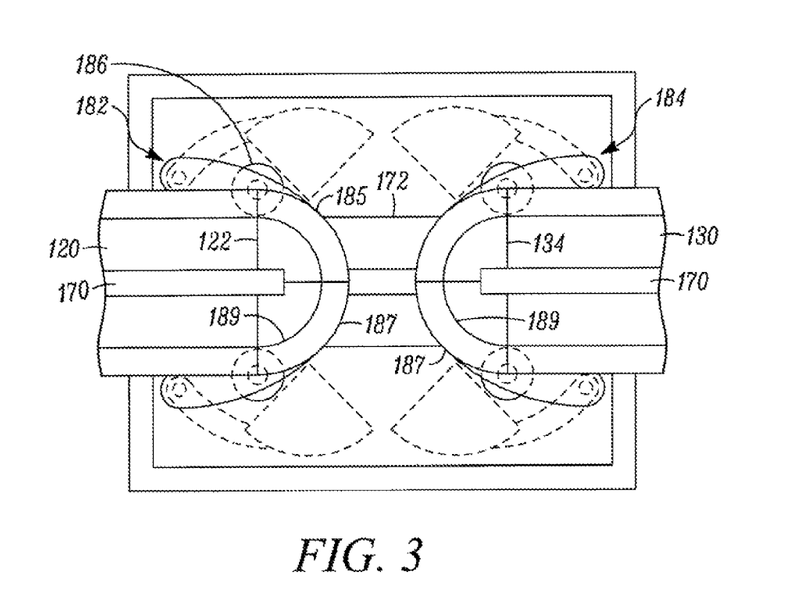
FIG. 3 is a side view showing a first transverse valve assembly of the rotary internal combustion engine where the closed position of the first compression chamber valve and the second expansion chamber valve is shown in solid line, and the open position is shown in broken lines.

FIG. 3 is a side view showing the first transverse valve assembly 180 of the rotary internal combustion engine 100. Because the second transverse valve assembly 190 is substantially similar in construction to the first transverse valve assembly 180, the description of the first transverse valve assembly 180 made with respect to FIG. 3 is equally applicable to the second transverse valve assembly 190.

The first compression chamber valve 182 and the second compression chamber valve 192 each include an upper valve portion 185 and a lower valve portion 187. The upper valve portion 185 and the lower valve portion 187 are each substantially in the shape of a quarter hemisphere, such that the upper valve portion 185 and the lower valve portion 187 of each of the first compression chamber valve 182 and the second compression chamber valve 192 cooperate to define a substantially semihemispherical shape for each of the first compression chamber valve 182 and the second compression chamber valve 192. By providing an interior shape for each of the first compression chamber valve 182 and the second compression chamber valve 192 that is complementary to an exterior shape of the piston 140, the valve timing for the first transverse valve assembly 180 can be such that the clearance between the piston 140 and the interior surface 189 of the second expansion chamber valve 184 can be minimized prior to opening of the second expansion chamber valve 184. Likewise, the clearance between the interior surface of the first compression chamber valve 182 and the exterior of the piston 140 can be minimized upon closing of the first compression chamber valve 182. While the semihemispherical shape for the first compression chamber valve 182 and the second compression chamber valve 192 has been found to be well-suited to minimizing the clearance between the first compression chamber valve 182 and the second compression chamber valve 192 with respect to the piston 140, it should be understood that other shapes could be utilized for the first compression chamber valve 182 and the second compression chamber valve 192.

Figure 4:
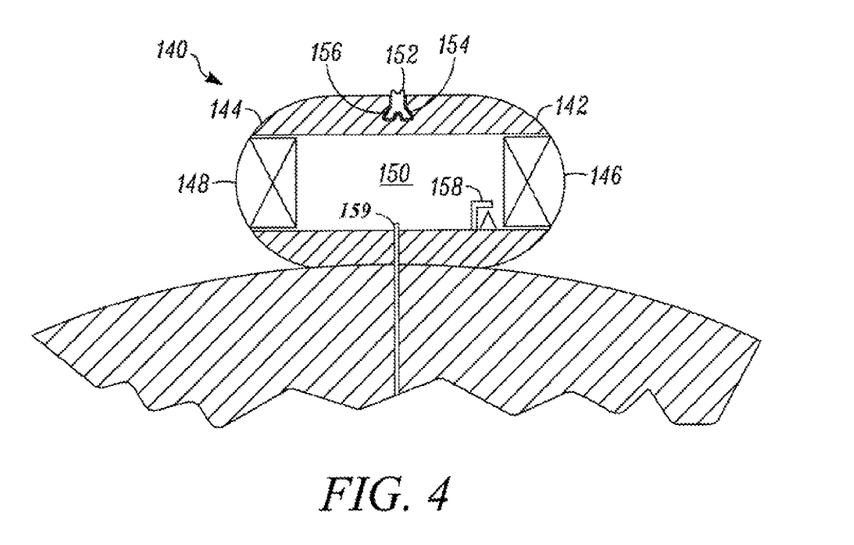
FIG. 4 is a top-down cross-section view of a piston of the rotary internal combustion engine.

As shown in FIG. 4, the piston 140 extends from a leading end 142 to a trailing end 144. The shape of the piston 140 is complementary to the shape of the compression chamber 120 and the expansion chamber 130, as well as the shape of the interior surface 189 of the valves of each of the first transverse valve assembly 180 and the second transverse valve assembly 190.

The piston 140 includes an inlet valve 146 and an outlet valve 148. The inlet valve 146 is located at the leading end 142 of the piston 140, and the outlet valve 148 is located at the trailing end 144 of the piston 140. The inlet valve 146 and the outlet valve 148 are each in communication with an internal chamber 150 of the piston 140. The inlet valve 146 and the outlet valve 148 are independently moveable between respective open and closed positions that permit and block, respectively, fluid communication between the internal chamber 150 and the exterior of the piston 140.

The inlet valve 146 and the outlet valve 148 can be any suitable type of valve that is able to selectively establish and disrupt fluid communication between the internal chamber 150 and the exterior of the piston 140. As one example, the inlet valve 146 and the outlet valve 148 can be pneumatically actuated valves that open and close in response to pressure conditions outside of the piston 140. For example, the inlet valve 146 could open in response to a high-pressure condition adjacent to the leading end 142 of the piston 140, and the outlet valve 148 can open in response to a high-pressure condition in the internal chamber 150 of the piston 140. As another example, the inlet valve 146 and the outlet valve 148 can be mechanically operated valves that are open and closed in response to operation of a camming mechanism (not shown) that operates dependent on the position of the piston 140 with respect to the compression chamber 120 and the expansion chamber 130. As another example, the inlet valve 146 and the outlet valve 148 could be electrically operated valves, such as solenoid valves, that are electronically controlled to open and close at predetermined points during the travel of the piston 140 through the compression chamber 120 and the expansion chamber 130. Other types of valves can be used as the inlet valve 146 and the outlet valve 148.

In order to allow sealing of the piston 140 with respect to the housing 110, a seal 152 can be seated in a groove 154 that is defined in the piston 140 and extends circumferentially around the piston 140 such that the seal 152 seals the piston 140 with respect to the housing 110, thereby sealing the area in front of the piston 140 from fluid communication with the area to the rear of the piston 140 external to the piston 140. The seal 152 can have an internal flared portion 156 that widens within the groove 154 in a dove-tail configuration, such that the seal 152 is retained within the groove 154 as the piston 140 travels between the compression chamber 120 and the expansion chamber 130.

The piston 140 can include an ignition source within the internal chamber 150. As an example, a spark-generating electrode 158 can be located within the internal chamber 150 for selectively causing combustion of the combustible mixture within the internal chamber 150. In alternative implementations, the piston 140 need not incorporate an ignition source. For example, in some implementations, ignition can occur by pressurizing the combustible mixture, similar to the operation of diesel cycle engines.

In some implementations, the piston 140 includes a fuel delivery component 159. As one example, the fuel delivery component can be or include a passageway along which fuel is delivered. As another example, the fuel delivery component can be or include a nozzle, a fuel injector, and/or a valve. In implementations where the compressible fluid that is introduced into the compression chamber 120 at the intake port is an oxidant that does not include fuel, a fuel is provided to the internal chamber 150 of the piston 140 by the fuel delivery component 159. As an example, the fuel can be provided to the internal chamber 150 while the piston moves through the compression chamber 120 with the inlet valve 146 in the open position and the outlet valve 148 in the closed position. Thus, as the compressible fluid is compressed into the internal chamber 150, the compressible fluid mixes with the fuel to define the combustible mixture, while the fuel remains in the internal chamber 150 of the piston as a result of the pressurization of the compressible fluid. In implementations where the compressible fluid includes fuel, the fuel delivery component can be omitted.

In order to allow cooling of the piston 140, fluid ducts (not shown in FIG. 4) can be formed in the piston 140 adjacent to the internal chamber 150, and a cooling fluid, such as a liquid coolant solution or water, can be circulated through the fluid ducts.

Figure 5A:
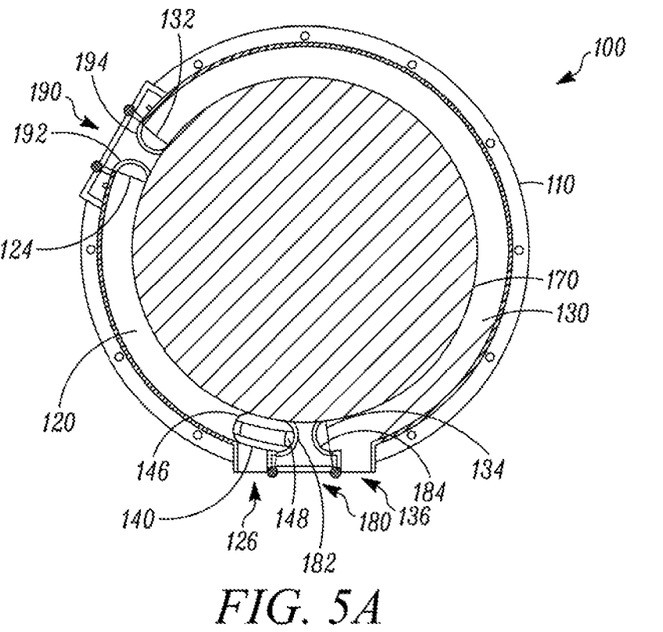
FIG. 5A is a top-down cross-section view of the rotary internal combustion engine at the beginning of a compression/intake phase.

A compression/intake phase of the rotary internal combustion engine 100 will now be explained with reference to FIGS. 5A-5B. FIG. 5A shows the rotary internal combustion engine 100 at the beginning of the compression/intake phase. The piston 140 is disposed within the compression chamber 120, at the first end 122 of the compression chamber 120. The first compression chamber valve 182 is closed, and the trailing end 144 of the piston 140 is disposed directly adjacent to the first compression chamber valve 182, such that a minimal clearance is present between the piston 140 and the first compression chamber valve 182. When the piston 140 enters the compression chamber 120, the compressible fluid is present within the compression chamber 120, the first compression chamber valve 182 is closed, and the second compression chamber valve 192 is closed. The inlet valve 146 of the piston 140 opens either upon entry of the piston 140 into the compression chamber 120 or during movement of the piston 140 through the compression chamber 120. The outlet valve 148 of the piston 140 closes prior to entry of the piston 140 into the compression chamber 120, upon entry of the piston 140 into the compression chamber 120, or during movement of the piston 140 through the compression chamber 120. While the piston 140 moves within the compression chamber 120 and subsequent to the outlet valve 148 moving to the closed position, the compressible fluid that is located within the compression chamber 120 is compressed and is forced into the piston 140. Because the outlet valve 148 is closed, the piston 140 is sealed with respect to the compression chamber 120, the compressible fluid ahead of the piston 140 is prevented from moving into the area of the compression chamber 120 to the rear of the piston 140, thereby facilitating compression. At the same time, an additional volume of the compressible fluid is drawn into the compression chamber 120 behind the piston 140 by way of the intake port 126.

Figure 5B:
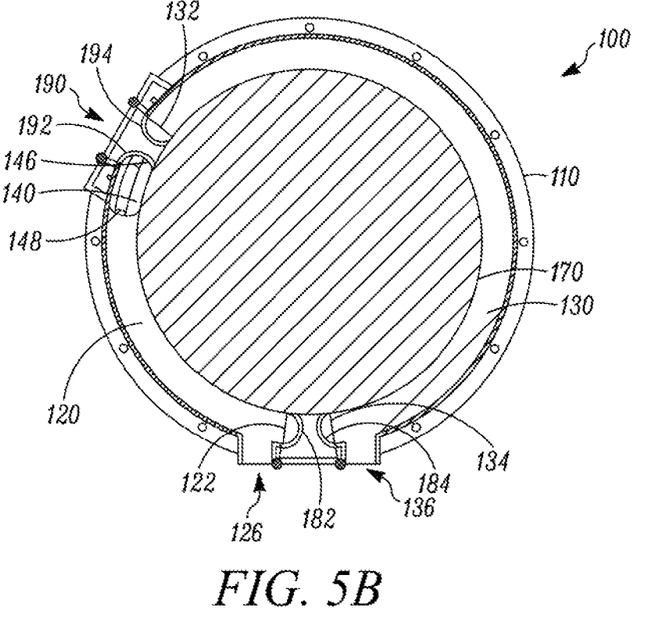
FIG. 5B is a top-down cross-section view of the rotary internal combustion engine at the end of the compression/intake phase.

As shown in FIG. 5B, when the piston 140 is disposed at the second end 124 of the compression chamber 120, a minimum clearance is defined between the leading end 142 of the piston 140 and the second compression chamber valve 192, the inlet valve 146 of the piston 140 closes, thereby trapping the compressible fluid within the internal chamber 150 of the piston 140, and the additional volume of the compressible fluid has been drawn into the compression chamber 120 for use during the next occurrence of the compression/intake phase. At this point, a combustible mixture is now disposed in the internal chamber 150 of the piston, either by provision of the combustible mixture as the compressible fluid, or by supplying fuel into the internal chamber 150 of the piston 140 by the fuel delivery component 159 to define the combustible mixture by mixing of the compressible fluid with the fuel during compression of the compressible fluid.

During the compression/intake phase, the first compression chamber valve 182 and the second compression chamber valve 192 remain closed, thereby isolating the compression chamber 120 from fluid communication with other portions of the rotary internal combustion engine 100, including the expansion chamber 130. Upon reaching the second compression chamber valve 192, the second compression chamber valve 192 opens, and the first expansion chamber valve 194 subsequently opens, thereby allowing the piston 140 to pass out of the compression chamber 120 and into the expansion chamber 130. As the piston 140 does so, the inlet valve 146 and the outlet valve 148 are closed.

Figure 6A:
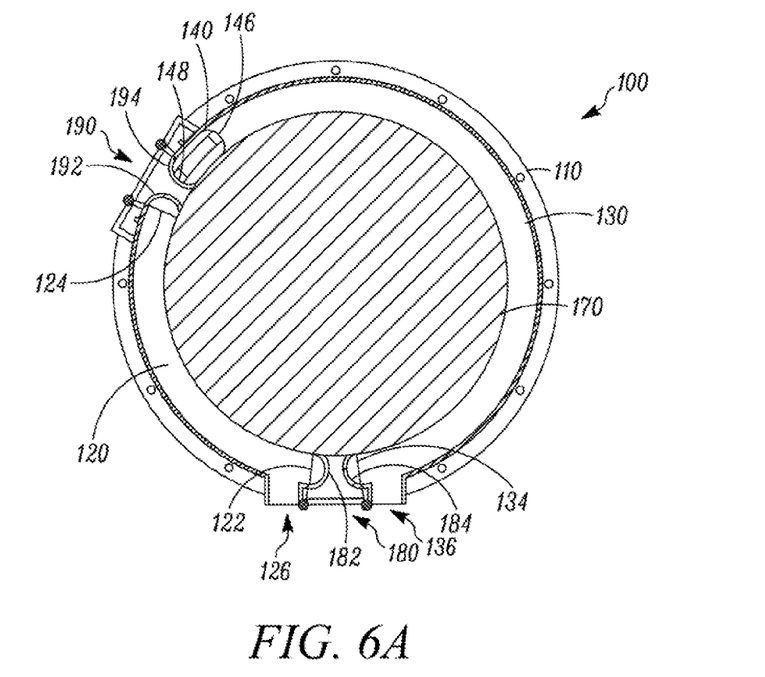
FIG. 6A is a top-down cross-section view of the rotary internal combustion engine at the beginning of a expansion/exhaust phase.

The expansion/exhaust phase of the rotary internal combustion engine 100 will now be explained with reference to FIGS. 6A-6B. As shown in FIG. 6A, the piston 140 is located at the first end 132 of the expansion chamber 130 at the beginning of the expansion/exhaust phase. The first expansion chamber valve 194 closes when the piston 140 is positioned such that it is located within the expansion chamber 130 and a minimum clearance is established between the trailing end 144 of the piston 140 and the first expansion chamber valve 194. At this time, the first expansion chamber valve 194 and the second expansion chamber valve 184 are both closed.

Combustion of the combustible mixture is initiated within the internal chamber 150 of the piston 140 after the piston inlet valve 146 is closed. This may happen when the leading edge of the piston is at its closest position to the second compression chamber valve 192 or at any point after the combustible mixture is isolated within the internal chamber 150 by the closing of piston inlet valve 146. The timing of this event may be chosen with regard to flame front propagation speeds of a particular fuel. With the piston 140 positioned within the expansion chamber 130 and the first and second expansion chamber valves 194 and 184 both disposed in their respective closed positions, the outlet valve 148 of the piston 140 is opened while the inlet valve 146 of the piston 140 remains closed. As the combustible mixture expands during combustion, the expanding combustion gases act against the interior of the piston and are forced out of the outlet valve 148 of the piston 140. The pressure between the piston 140 and the first expansion chamber valve 194 causes rotational force to be exerted upon the piston 140 and the rotor 170, thereby propelling the piston 140 within the expansion chamber 130.

As the piston 140 travels toward the second end 134 of the expansion chamber 130, an additional volume of the combustion gas that was previously produced by combustion of the combustible mixture within the expansion chamber is located in front of the piston 140 and is forced out of the expansion chamber 130 and into the exhaust port 136 by motion of the piston 140, so that the combustion gas can be removed from the rotary internal combustion engine 100 and exhausted.

Figure 6B:
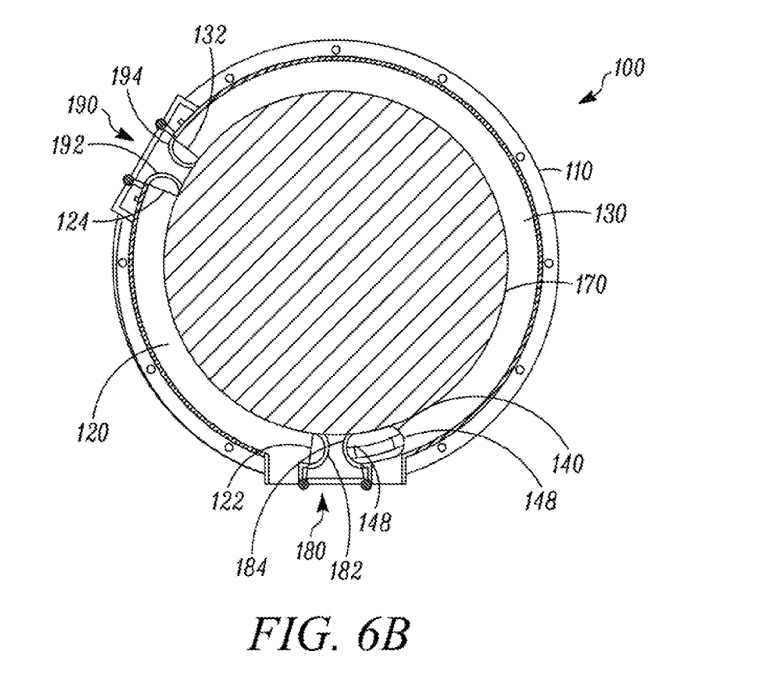
FIG. 6B is a top-down cross-section view of the rotary internal combustion engine at the end of the expansion/exhaust phase.

When the piston 140 reaches the second end 134 of the expansion chamber 130, as shown in FIG. 6B, the inlet valve 146 of the piston 140 opens to facilitate removal of byproducts of the combustion process from the internal piston chamber 150. Up to this point, the first expansion chamber valve 194 and the second expansion chamber valve 184 have been disposed in their respective closed positions, such that the expansion chamber 130 has been isolated from other components of the rotary internal combustion engine 100, such as the compression chamber 120. When a minimum clearance has been achieved between the leading end 142 of the piston 140 and the second expansion chamber valve 184, the second expansion chamber valve 184 opens to allow the piston 140 to pass out of the expansion chamber 130. The first compression chamber valve 182 subsequently opens to allow the piston 140 to enter the compression chamber 120, thereby restarting the four cycle power production process.

In an alternative implementation, the combustion-propulsion cycle described above can be combined with a cooling-propulsion cycle, which will be described herein. As an example, three iterations of the combustion cycle can be performed, followed by the cooling-propulsion cycle. The numbers of iterations of each type of cycle can be adjusted to allow different operating characteristics.

Figure 7:
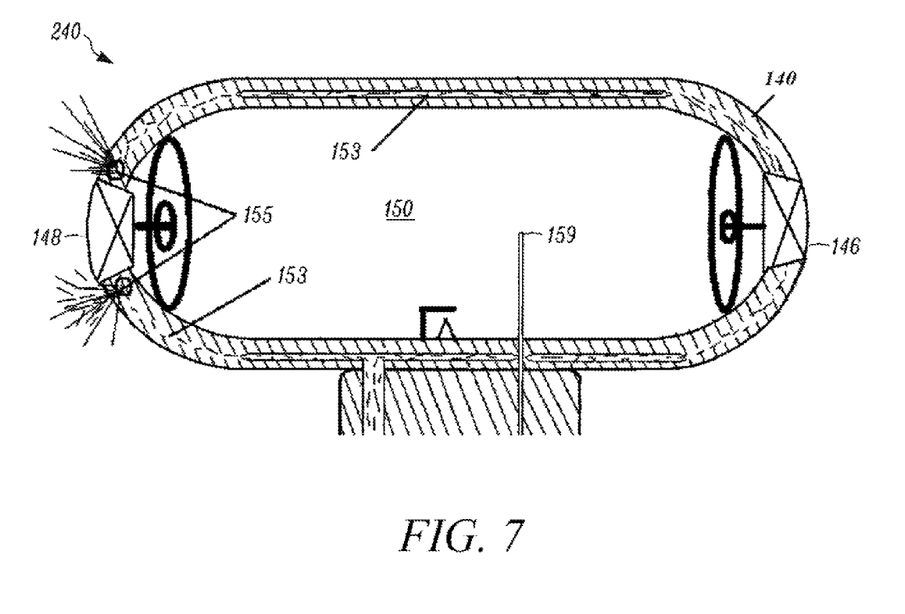
FIG. 7 is a top-down cross-section view of an alternative piston of the rotary internal combustion engine.

In addition to the four-cycle operation of the rotary internal combustion engine 100, comprised of intake, compression, expansion, and the exhaust of combustion byproducts, a second expansion cycle can be implemented by the expansion of a substance, such as water, used to cool the piston. FIG. 7 shows a piston 240 that can be incorporated in the rotary internal combustion engine 100. The piston 240 is identical to the piston 140 except as noted herein. The piston 240 includes a heat exchange chamber 153 and outlet ports 155. In the expansion cycle, a cooling substance is expanded within a heat exchanger 153, which is formed between the inner and outer walls of the piston 240. In one example, the cooling substance is a liquid coolant, such as water.

While the piston 140 is in the expansion chamber 130, the cooling substance is introduced into the heat exchanger 153. The pressure from the expanding cooling substance, as it cools the components in contact with the combustion phase, then acts against the interior of the heat exchanger 153 or piston 240 and is forced out of the outlet ports 155. In an alternative example, the outlet ports 155 are omitted, and the expanding substance is directed out of the outlet valve 148 of the piston 140, which in such an implementation opens and closes the heat exchanger 153 as well as the internal chamber 150. The pressure between the piston 140 and the first expansion chamber valve 194 causes rotational force to be exerted upon the piston 140 and the rotor 170, thereby propelling the piston 140 within the expansion chamber 130. Alternatively, the cooling substance can be directly injected into the internal chamber 150 and propulsion by expansion of the cooling material can occur via the outlet valve 148 of the piston.

While the description herein has been made in connection with what is presently considered to be the most practical and preferred embodiment, it is to be understood that the claims are not to be limited to the disclosed embodiments but, on the contrary, are intended to cover various modifications and equivalent arrangements.

What is claimed is:

1. A rotary internal combustion engine, comprising: an arcuate compression chamber; an arcuate expansion chamber; an output shaft; and a piston coupled to the output shaft for movement through the arcuate compression chamber and the arcuate expansion chamber, the piston having a leading end, a trailing end, an inlet valve that is located at the leading end of the piston for receiving a compressible fluid from the arcuate compression chamber, an outlet valve that is located at the trailing end of the piston for expelling a combustion gas into the arcuate expansion chamber, and a fuel delivery port that provides a fuel directly to an internal chamber of the piston, wherein the compressible fluid is an oxidant that does not include fuel, the compressible fluid is mixed with the fuel in the internal chamber of the piston to define a combustible mixture, the combustible mixture is located within the internal chamber of the piston as the piston enters the arcuate expansion chamber, and the combustible mixture is combusted within the piston as the piston moves through the arcuate expansion chamber to produce the combustion gas.

2. The rotary internal combustion engine of claim 1, wherein the arcuate compression chamber is sealed from communication with the arcuate expansion chamber while the piston is disposed within the arcuate compression chamber and the arcuate compression chamber is sealed from communication with the arcuate expansion chamber while the piston is disposed within the arcuate expansion chamber.

3. The rotary internal combustion engine of claim 1, further comprising:
    a first compression chamber valve located at a first end of the arcuate compression chamber, wherein the first compression chamber valve is movable from a closed position to an open position to allow the piston to enter the arcuate compression chamber; and
    a second compression chamber valve located at a second end of the arcuate compression chamber, wherein the second compression chamber valve is movable from a closed position to an open position to allow the piston to exit the arcuate compression chamber.

4. The rotary internal combustion engine of claim 3, wherein the compressible fluid is located within the arcuate compression chamber when the piston enters the arcuate compression chamber and the compressible fluid is compressed between the second compression chamber valve and the piston and is forced into the piston as the piston moves through the arcuate compression chamber toward the second compression chamber valve.

5. The rotary internal combustion engine of claim 4, further comprising:
    an intake port in communication with the arcuate compression chamber for supplying the compressible fluid to the arcuate compression chamber, wherein the intake port is located adjacent to the first end of the arcuate compression chamber.

6. The rotary internal combustion engine of claim 5, wherein an additional volume of the compressible fluid is drawn into the arcuate compression chamber from the intake port behind the trailing end of the piston as the piston moves through the arcuate compression chamber.

7. The rotary internal combustion engine of claim 3, further comprising:
    an exhaust port in communication with the arcuate expansion chamber for receiving the combustion gas, wherein the exhaust port is located adjacent to the second end of the arcuate expansion chamber.

8. The rotary internal combustion engine of claim 7, wherein an additional volume of combustion gas is present in the arcuate expansion chamber and is forced out of the arcuate expansion chamber and into the exhaust port ahead of the leading end of the piston as the piston moves through the arcuate expansion chamber.

9. The rotary internal combustion engine of claim 3, wherein an interior shape of the first compression chamber valve is complementary to an exterior shape of the trailing end of the piston and an interior shape of the second compression chamber valve is complementary to an exterior shape of the leading end of the piston.

10. The rotary internal combustion engine of claim 1, wherein the inlet valve of the piston is in an open position while the piston travels through the arcuate compression chamber.

11. The rotary internal combustion engine of claim 1, wherein the inlet valve of the piston is in a closed position and the outlet valve of the piston is an open position while the piston travels through the arcuate expansion chamber.

12. A rotary internal combustion engine, comprising:
    an arcuate compression chamber;
    an arcuate expansion chamber;
    an output shaft;
    a piston coupled to the output shaft for movement through the arcuate compression chamber and the arcuate expansion chamber, the piston having a leading end, a trailing end, an inlet valve that is located at the leading end of the piston for receiving a compressible fluid from the arcuate compression chamber, an outlet valve that is located at the trailing end of the piston for expelling a combustion gas into the arcuate expansion chamber, and a fuel delivery port that provides a fuel directly to an internal chamber of the piston;

a first compression chamber valve located at a first end of the arcuate compression chamber, wherein the first compression chamber valve is movable from a closed position to an open position to allow the piston to enter the arcuate compression chamber;

a second compression chamber valve located at a second end of the arcuate compression chamber, wherein the second compression chamber valve is movable from a closed position to an open position to allow the piston to exit the arcuate compression chamber;

a first expansion chamber valve located at a first end of the arcuate expansion chamber, wherein the first expansion chamber valve is movable from a closed position to an open position to allow the piston to enter the arcuate expansion chamber; and a second expansion chamber valve located at a second end of the arcuate expansion chamber, wherein the second expansion chamber valve is movable from a closed position to an open position to allow the piston to exit the arcuate expansion chamber.

13. A rotary internal combustion engine, comprising:
an arcuate compression chamber;
an arcuate expansion chamber;
an output shaft; and
a piston coupled to the output shaft, the piston having a leading end, a trailing end, an inlet valve located at the leading end, an outlet valve located at the trailing end, and an internal chamber in communication with the inlet valve and the outlet valve, wherein the inlet valve of the piston and the outlet valve of the piston are each at least one of a mechanically operated valve or an electrically operated valve, and are controlled such that the inlet valve is closed and the outlet valve is open during combustion of a combustible mixture to propel the piston within the arcuate expansion chamber and such that the inlet valve and the outlet valve are open simultaneously subsequent to combustion of the combustible mixture to facilitate removal of byproducts of combustion of the combustible mixture from the internal chamber of the piston.

14. The rotary internal combustion engine of claim 13, wherein the inlet valve of the piston is adapted to admit a compressible fluid from the arcuate compression chamber into the internal chamber of the piston while the piston moves through the arcuate compression chamber.

15. The rotary internal combustion engine of claim 14, wherein the compressible fluid is utilized to cause combustion within the internal chamber of the piston to produce a combustion gas.

16. The rotary internal combustion engine of claim 15, wherein the outlet valve of the piston is adapted to expel the combustion gas from the internal chamber of the piston into the arcuate expansion chamber while the piston moves through the arcuate expansion chamber.

17. The rotary internal combustion engine of claim 13, further comprising:
a first valve assembly for isolating a first end of the arcuate compression chamber from a second end of the arcuate expansion chamber; and
a second valve assembly for isolating a second end of the arcuate compression chamber from a first end of the arcuate expansion chamber.

18. A rotary internal combustion engine, comprising:
an arcuate compression chamber;
an arcuate expansion chamber;
an output shaft;
a piston coupled to the output shaft for movement through the arcuate compression chamber and the arcuate expansion chamber, the piston having a leading end, a trailing end, an inlet valve that is located at the leading end of the piston for receiving a compressible fluid from the arcuate compression chamber, an outlet valve that is located at the trailing end of the piston for expelling a combustion gas into the arcuate expansion chamber, and a fuel delivery port that provides a fuel directly to an internal chamber of the piston;
a first compression chamber valve located at a first end of the arcuate compression chamber, wherein the first compression chamber valve is movable from a closed position to an open position to allow the piston to enter the arcuate compression chamber; and
a second compression chamber valve located at a second end of the arcuate compression chamber, wherein the second compression chamber valve is movable from a closed position to an open position to allow the piston to exit the arcuate compression chamber, wherein an interior shape of the first compression chamber valve is substantially hemispherical and the interior shape of the second compression chamber valve is substantially hemispherical.

* * * * *